United States Patent

Paul

[15] 3,658,454
[45] Apr. 25, 1972

[54] DYEING KERATINACEOUS MATERIAL WITH N-CARBAMOYLETHYL AMINES

[72] Inventor: Albert Peter Paul, Teaneck, N.J.
[73] Assignee: American Cyanamid Company, Stamford, Conn.
[22] Filed: May 16, 1969
[21] Appl. No.: 825,428

[52] U.S. Cl. .......................... 8/10, 8/11, 260/558, 260/559
[51] Int. Cl. ....................... D06p 3/04, D06p 3/08
[58] Field of Search ............... 8/10, 11; 260/558, 559

[56] References Cited

UNITED STATES PATENTS

| | | | |
|---|---|---|---|
| 2,346,013 | 4/1944 | Dickey | 260/205 |
| 3,117,911 | 1/1964 | Kalopissis et al. | 8/10 X |
| 3,236,891 | 2/1966 | Seemuller | 8/10 X |
| 3,420,883 | 1/1969 | Bartoszewicz | 8/11 X |

Primary Examiner—George F. Lesmes
Assistant Examiner—Patricia C. Ives
Attorney—Patrick C. Baker

[57] ABSTRACT

Method of dyeing keratinaceous material such as hair or fur by contacting same with an N-carbamoylethyl aromatic amine of the formula

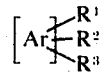

where Ar is benzene, biphenyl or naphthalene; $R^1$ is 2-carbamoylethylamino or bis(2-carbamoylethyl)amino; $R^2$ is amino, nitro, hydroxy or $R^1$; and $R^3$ is amino, nitro, hydrogen, halo, lower alkyl, lower alkoxy or $R^1$; or acid addition salts thereof. The invention also includes compositions containing the N-carbamoylethyl aromatic amines.

7 Claims, No Drawings

DYEING KERATINACEOUS MATERIAL WITH N-CARBAMOYLETHYL AMINES

This invention relates to a method and to compositions for dyeing fibrous materials, particularly keratinaceous materials such as animal and human hair, wherein the method comprises applying to said materials an N-carbamoylethyl aromatic amine, or composition containing same, of the formula (I):

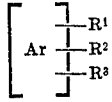

where Ar is benzene, biphenyl or naphthalene; $R^1$ is 2-carbamoylethylamino or bis(2-carbamoylethyl)amino; $R^2$ is amino, nitro, hydroxy or $R^1$; and $R^3$ is amino, nitro, hydrogen, halo, lower alkyl, lower alkoxy or $R^1$. The compounds of this invention also include the acid addition salts of compounds of the above formula, including organic and inorganic acid addition salts. The inorganic acids are preferred, typical examples being sulfuric, hydrochloric, phosphoric, nitric, and boric. Organic acids include both the mono- and polycarboxylic acids such as formic, acetic, propionic, capric, stearic, benzoic, malonic, succinic, and phthalic.

A related application field on the same day U.S. application Ser. No. 825,434, filed May 16, 1969, now abandoned discloses and claims the above-described aromatic amines and salts, and a second application U.S. application Ser. No. 825,427, filed May 16, 1969, also filed on the same day, covers a preferred method of preparing the above compounds.

The compounds of Formula I or salts thereof may be prepared by at least three methods. In the first method an aromatic amine or aromatic nitroamine is reacted with acrylamide in acetic acid (dilute or glacial, 10–100 percent) at an elevated temperature, preferably from about 50°C. to about 120°C., to give a product wherein one or more of the amino hydrogen atoms is replaced by a carbamoylethyl group.

In a second method, an aromatic nitroamine is reacted with acrylamide at about 25°C. to 145°C. in a polar, non-hydroxylated solvent such as dimethylformamide and in the presence of a basic catalyst having a $pK_b$ (negative logarithm of the basicity dissociation constant) of less than 10 to give a product having a nitro group and at least one propionamide group. Typical of the basic catalysts are quaternary ammonium hydroxides such as benzyl trimethyl ammonium hydroxide and alkali metal alkoxides such as sodium or potassium tertiary butoxide or methoxide. The basic catalyst is employed in catalytic amounts such as 0.01 – 0.5 mol of catalyst per mol of aromatic nitroamine reactant, preferably 0.02 – 0.04 mol, same basis. This method is the subject of a copending application filed on the same day as the present application under the name of Richard Boardman Toothill, U.S. application Ser. No. 825,427.

In a third method, the nitro-substituted products may be prepared from the corresponding halo- and nitro-substituted aromatic compounds by reaction with aminopropionamide or iminobispropionamide in a lower alkanol such as ethanol in the presence of a weak base such as sodium bicarbonate, pyridine or triethanolamine. The reaction is conducted at elevated temperature, preferably reflux, and the aminopropionamide or iminobispropionamide group replaces the halo group.

In the second method of preparation, where the starting material is an aromatic nitro diamine or aminonitrophenol, a lower alkanol such as ethanol is also present and the reaction temperature is from about 60°C. to reflux.

In the first and second above methods, one or both hydrogen atoms on the amino groups of the starting material are replaced by one or two carbamoylethyl groups to give one to three mono- or di-carbamoylethyl groups in the product. The number of such groups in the product will depend, of course, on variables such as the number of amino and other groups in the reactant, mol ratios of reactants, and conditions of temperature and reaction medium. One exception to this generalization occurs when the reactant contains a single amino group and a single nitro group. In this instance the nitro bispropionamide product results only by the second method above.

In the third method of preparation, those reactants in which the halo group is ortho or para to the nitro group are preferred. Here again the degree of aminopropionamide or iminobispropionamide substitution will depend on choice of starting material (the number of active halogen atoms), reactant mol ratios, and other reaction conditions, except as described above.

Where the product of the three methods described above contains at least one nitro group, one or more of the nitro groups may be reduced to amino by known procedures such as reaction at superatmospheric pressures over palladium on carbon in ethanol.

As noted above, the type and degree of substitution in the compounds of the invention will depend primarily on choice of reactants and reactant mol ratios. Thus, the relationship of $R^1$, $R^2$, and $R^3$ may be ortho, meta, or para, or any combination thereof, with those limitations readily apparent to the skilled chemist. Regarding their utility as dyes for keratinaceous materials, however, those compounds are preferred in which $R^1$ and $R^2$ are ortho or para.

Representative of the aromatic nitroamine reactants useful in preparing the compounds of the invention are the following: anilines such as 2-nitro, 3-nitro, 4-nitro, 2- or 3-chloro-4-nitro-, 2- or 3-methyl-4-nitro, 2- or 3-methoxy-4-nitro, and 2,4-dinitro-aniline; naphthylamines such as 1-amino-2-nitro-, 2-amino-1-nitro-, 2-amino-3-nitro-, 1-amino-8-nitro-, and 1-amino-2,4-dinitro-naphthalene; and biphenylamines (x-enylamines) such as 2-amino-2'-nitro-, 4-amino-4'-nitro-, 4-amino-3-nitro-, and 4,4-diamino-3,3'-dinitro-biphenyl.

Representative aromatic polyamine reactants are the following: ortho or para phenylenediamines such as 1,2-diaminobenzene, 1,3-diaminobenzene, 1,4-diaminobenzene, 1,4-diamino-2-methylbenzene, 1,4-diamino-2-methoxybenzene, 2-chloro-1,4-diaminobenzene, 1,4-diamino-2-nitrobenzene; diaminonaphthalenes such as 1,2-diamino-, 1,4-diamino-, 1,8-diamino-, 2,3-diamino-, 2,6-diamino-, 1,4-diamino-2-nitro, and biphenylamines such as 2,2'-diamino-, 4,4'-diamino-, 4,4'-diamino-3,3'-dinitro-, 3,4-di-amino and 3,3',4,4'. Typical aromatic hydroxy amine reactants are the following: aminophenols such as 2(or 3)-aminophenol, 2-amino-4-methyl-2-amino-4(or 5)-nitrophenol, 4-aminophenol, 4-amino-2(or 3)-chlorophenol, 4-amino-2(or 3)-methoxyphenol, and 4-amino-2(or 3)-methylphenol; aminonaphthols such as 1-amino-5-(or 8)-hydroxynaphthalene and 2-amino-1(or 3)-hydroxynaphtha-lene; and hydroxyphenylamines such as 4-amino-4'-hydroxybiphenyl and 4-amino-2-hydroxybiphenyl.

It is often desirable to isolate the compounds of Formula I above as acid addition salts since the salts tend to be more stable to air oxidation, particularly where the products have one or more amino groups or an hydroxyl group. This is done after carbamoylethylation is complete and after the product has undergone further reduction to the extent intended, by clarifying the solution of the final product, and adding dilute or concentrated mineral acid, preferably hydrochloric or sulfuric.

Given the above description, the remaining details of the methods of preparation will be readily apparent. For example, conditions such as equivalent solvents and catalysts, order of addition, concentration of reactants and catalysts in the reaction medium, temperature, pressure, workup and isolation procedures, are routine. Likewise, the starting materials are known and, for the most part, commercially available.

The compounds of this invention are useful as dyestuffs, particularly for dyeing keratinaceous materials. In regard to the dyeing of keratinaceous fibers, particularly human hair, the compounds comprise two classes: direct dyes and oxidation dyes. Those compounds wherein at least one of $R^2$ and $R^3$ is nitro are direct dyes; those compounds devoid of nitro groups or wherein at least one of R² and R³ is amino or hydroxyl are oxidation dyes or oxidation dye modifiers. Compounds containing both a nitro group and an amino or hydroxyl group impart color directly.

The hair dye utility of the compounds of this invention is based not only on the ability of these compounds to impart a wide variety of colors to hair, depending on the compound employed or upon combination with known color modifiers, but also on other required properties which they possess such as the following: solubility or dispersibility in a wide variety of cosmetic vehicles, substantivity to the hair, substantially no tendency to sublimation on the hair, substantial stability in dye baths, dyeability at ambient temperature, uniform and level dyeing properties, and good reproducibility of dyeing properties including color fastness and wear fastness. The oxidation dye compounds of this invention are superior to the many N-alkylated derivatives of phenylenediamine compounds whether used alone or in mixtures with commercially available oxidation dyes or modifiers. Likewise, the direct dyeing compounds of this invention have properties superior to nitro and other direct hair dyes, have better solubility, provide brilliant colors, dye rapidly and level, and are useful whether the hair be virgin, bleached or permanently waved.

Especially noteworthy properties of these compounds are the variety and depth of colors they can impart to hair and the lightfastness of the colors. The superior lightfastness is discernible even when the compounds are admixed with commercial hair dyes. These properties appear to result primarily from the presence of the N-carbamoylethylamino group in the compounds, although they are enhanced by the presence of the other groups defined by R² and R³ since these groups (except hydrogen) are known chromophores or auxochromes. Indeed, the dye chemist, given the present disclosure, can easily substitute many other known chromophore and auxochrome groups for those defined by R² and R³. For example, chromophore groups generally contain electronegative atoms or groups of atoms and include groups containing sulfonyl, carbonyl, thiocarbonyl, azo, and groups containing ethylenically unsaturated carbon atoms. Similarly, the dye chemist would know how to substitute on the aromatic ring other auxochrome (electron donating) groups such as primary and secondary amino, alkoxy, aryloxy, or aralkyloxy groups.

The compounds of formula (I) may be admixed with a wide variety of known materials and applied to the hair by known methods to achieve superior dyeing effects. For example, the compounds which operate as oxidation dyes may be dissolved in a suitable aqueous medium, which may contain ingredients listed below, and adjusted to the desired pH. The resulting composition is then mixed with about equal parts of a peroxide solution such as 6 percent hydrogen peroxide or solutions of equivalent strength containing urea peroxide, melamine peroxide, or persalts such as bromate, perborate, percarbonate, or persulfate. Depending on the peroxide concentration and pH, the resulting composition will bleach as well as dye the hair.

The dye solution may also contain other ingredients commonly employed in the dyestuffs art. These include nontoxic organic solvents miscible with water such as benzyl, ethyl and isopropyl alcohols; stabilizers against air oxidation such as sodium sulfite; emulsifiers and surfactants for dye solubilization and color absorption; opacifying and thickening agents; and color modifiers.

The color modifiers encompass the whole field of known oxidation and direct dyes. Included among the known oxidation dye color modifiers are the phenols (amino-, nitro- or polyhydroxy phenols) such as pyrogallol, hydroquinone, p-hydroxy anisole, resorcinol, phloroglucinol, pyrocathechol, 2,4-dinitrophenol, o-aminophenol, m-aminophenol, p-aminophenol, 2,4-diaminophenol, 2,6-diaminopyridine, hydroxy pyridine, m-diamino anisol sulfate, and the like; and aromatic diamines such as o-, m- and p-phenylene diamine, 2,4-diaminoanisole, o-nitro-p-phenylene diamine, p-toluylene diamine, and the like.

The compounds of formula (I) may be employed singly or in admixture, with or without one or more of the known color modifiers and other additives, to give the desired tones. The compounds are effective as hair dyes over a wide pH range, from about 2 to about 12, but a pH of at least about 7 is preferred, more particularly in the range of from about 7.5 to about 10. Any water-dispersible basic material which is compatible with the balance of the dye composition may be employed, in an amount which will provide the desired pH. Ammonium hydroxide is preferred but other basic compounds are useful, such as the alkali and alkaline earth metal hydroxides, carbonates or bicarbonates; amines such as primary aliphatic diamines (ethylenediamine, 1,2-diaminopropane, and the like), alkanolamines (ethanolamine, diethanolamine, and the like), and heterocyclic amines (morpholine, piperidine, piperazine, and the like). The pH may also be adjusted with acidic compounds, including organic or inorganic acids or salts thereof, such as sulfuric, formic, acetic or citric acid, ammonium sulfate, sodium dihydrogen phosphate, or potassium bisulfate.

The following examples are intended as further illustration of the invention and are not necessarily limitative. All parts and percentages are by weight unless otherwise specified.

EXAMPLE 1

3-p-Nitroanilinopropionamide

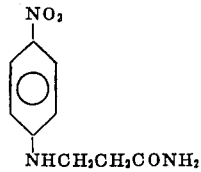

To 100 ml. glacial acetic acid is added in portions, 13.8 g. (0.1 mole) p-nitroaniline and 7.1 g. (0.1 mole) acrylamide. After completion of addition the solution is stirred at 80°C. for 10 hours and ambient temperature for 1 hour. The solution is poured with stirring into 1500 ml. water. The precipitate is collected by filtration, washed with 500 ml. water and dried in a steam oven to yield 12.6 g. of crude product. Removal of unreacted p-nitroaniline is effected by leaching several times with small portions of ethyl acetate and yields 5.5 g. 3-p-nitroanilinopropionamide, a yellow product, melting at 171.5°–173°C.

When this product is applied to albino, bleached or permanently waved hair from an alkaline vehicle in a concentration of 0.5 percent, a bright yellow shade is obtained after 10 minutes at ambient temperature.

EXAMPLE 2

3-(p-aminoanilino)propionamide

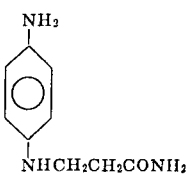

To a Parr bottle kept in a nitrogen atmosphere is added 200 mg. 10 percent Pd/C (palladium on carbon) catalyst which is immediately covered with 20 ml. ethanol. A warm slurry of 12.0 g. (0.057 mole) 3-p-(nitroanilino)propionamide (such as prepared in Example 1) in 200 ml. ethanol is added. Reduction is carried out on a Parr shaker at 40 psi of hydrogen without heating. Theoretical hydrogen take-up is accomplished within two hours. The catalyst is removed by gravity filtration followed by vacuum filtration through a hyflo cake. The filtrate is taken to dryness on a rotary evaporator to yield 9.0 g. 3-(p-aminoanilino)propionamide, tan crystals, melting at 94°–95.5°C.

Dissolved in an alkaline vehicle, in which it has very good solubility, in a concentration of 4 percent and applied to virgin, bleached or permanently waved hair, a black shade with a slight brown hue is obtained. Swatches of hair thus dyed have excellent light stability after 10 days of exposure to sunlight. The addition of a small quantity of p-hydroxyanisole, or 2,6-diaminopyridine in the presence of 2,5-dinitrophenol, results in a jet black shade of excellent light stability. Compounding with p-phenylenediamine results in a warm brown shade.

EXAMPLE 3

3,3'-(p-Nitrophenylimino)bispropionamide

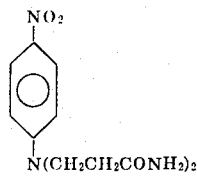

To 50 ml. dimethylformamide is added in portions, 27.6 g. (0.2 mole) p-nitroaniline, 28.4 g. (0.4 mole) acrylamide and 200 mg. potassium-t-butoxide. After stirring 18 hours at ambient temperature, the solution is poured into 1500 ml. water. The precipitate is collected by filtration, washed with 500 ml. water and dried in a steam oven. Removal of unreacted p-nitroaniline is effected by leaching several times with small portions of ethyl acetate to yield 26.0 g. 3,3'-(p-nitrophenylimino)bispropionamide, a yellow powder, melting at 201.5°–203°C. When applied to hair a yellow shade similar to but not as strong as that of Example 1, is obtained.

EXAMPLE 4

3,3'-(p-Aminophenylimino)bispropionamide

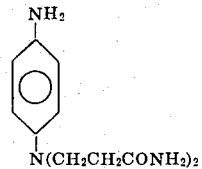

To a Parr bottle kept in a nitrogen atmosphere is added 200 mg. 10 percent Pd/C catalyst which is immediately covered with 20 ml. anhydrous methanol. A warm slurry of 10.0 g. (0.036 mole) 3,3'-(p-nitrophenylimino)bispropionamide in 200 ml. purified methanol is added. Reduction is carried out on a Parr shaker at 40 psi of hydrogen without heating. Theoretical hydrogen takeup is accomplished within 2 hours. The catalyst is removed by gravity filtration followed by vacuum filtration through a filter aid. The filtrate is taken to dryness on a rotary evaporator to yield 7.0 g. 3,3'-(p-aminophenylimino(bispropionamide, tan crystals, melting at 140°–141°C.

EXAMPLE 5

3,3'-(p-Phenylenediimino)bispropionamide

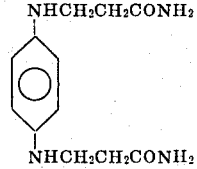

To 100 ml. ethanol under nitrogen is added in portions 10.8 g. (0.1 mole) p-phenylenediamine, 15.6 g. (0.22 mole) acrylamide and 5.0 ml. glacial acetic acid. The solution is refluxed under nitrogen for 4 hours and stirred at ambient temperature for 1 hour. The precipitate is collected by filtration, washed with ethanol and dried without heat in vacuo. Yield is 9.0 g. 3,3'-(p-phenylenediimino)bispropionamide, a gray powder, melting at 163°–165°C. When applied to albino hair in an alkaline vehicle, a yellow shade of medium depth is obtained.

EXAMPLE 6

3,3'-(p-Phenylenedinitrilo)tetrakispropionamide

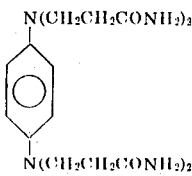

To 25 ml. ethanol and 75 ml. glacial acetic acid under nitrogen is added 10.8 g. (0.1 mole) p-phenylenediamine and 28.4 g. (0.4 mole) acrylamide. The solution is heated to 80°C. under nitrogen for 6 hours and stirred at ambient temperatures for 1 hour. Dimethylformamide, 100 ml. is added. The solution is poured into 1500 ml. isopropanol with stirring. The precipitate is collected by filtration, washed with isopropanol and dried without heat in vacuo to yield 20.5 g. 3,3'-(p-phenylenedinitrilo)tetrakispropionamide, lavender crystals, melting at 196°–197°C.

EXAMPLE 7

3-(4-Amino-3-nitroanilino)propionamide

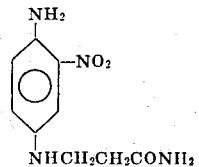

To 100 ml. ethanol is added 13.9 g. (0.1 mole) 2-nitro-p-phenylenediamine, 7.1 g. (0.1 mole) acrylamide and 10.0 ml. glacial acetic acid. The solution is heated at reflux for 18 hours, and stirred without temperature control for 1 hour; the product is collected by filtration and washed with carbon tetrachloride. It is dried without heat in vacuo to yield 12.1 g. 3-(4-amino-3-nitroanilino)propionamide, as red-brown crystals, melting at 144.5°–146.5°C. When applied to albino, virgin, bleached and permanently waved hair from alkaline medium, in 0.5 percent concentration, for 10 minutes at ambient temperature, an intense bluish-red shade is obtained. This compound has excellent levelling properties.

EXAMPLE 8

3,3'-(4-Amino-3-nitrophenylimino)bispropionamide

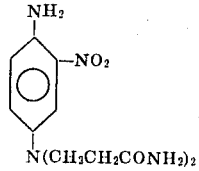

To 100 ml. ethanol is added 13.9 g. (0.1 mole) 2-nitro-p-phenylenediamine, 28.4 g. (0.4 mole) acrylamide and 10.0 ml. glacial acetic acid. The solution is heated at reflux for 24 hours and stirred at ambient temperature for 1 hour. The product is collected by filtration, washed with carbon tetrachloride and dried without heat in vacuo to yield 10.5 g. 3,3'-(4-amino-3-nitrophenylimino)bispropionamide, as red-brown crystals, sinters at 210°C., melting at 214°–215°C.

When applied to hair, in a manner similar to the compound of Example 7, a similar shade but not as strong, is obtained.

EXAMPLE 9

3-p-Hydroxyanilinopropionamide hydrochloride

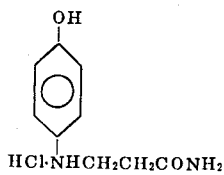

To a mixture of 150 ml. ethanol and 15 ml. glacial acetic acid is added 32.7 g. (0.3 mole) p-aminophenol and 21.3 g. (0.3 mole) acrylamide. The whole is heated at reflux under nitrogen for 18 hours. It is cooled to ambient temperature, acidified with concentrated hydrochloric acid and filtered. The product is washed with ethanol and dried. Yield is 24.9 g., melting at 186°–187°C. On recrystallization from mixed ethanol and ethyl acetate it melts at 194.5°–195°C.

EXAMPLE 10

3,3'-(p-Hydroxyphenylimino)bispropionamide

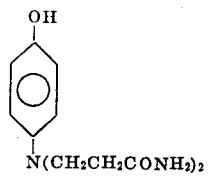

To 100 ml. ethanol is added 10.9 g. (0.1 mole) p-aminophenol, 14.2 g. (0.2 mole) acrylamide and 10 ml. glacial acetic acid. The solution is heated at reflux for 24 hours. The volume is reduced on a rotary evaporator until there is a slight amount of precipitation. n-Butanol (200 ml.) is added and the solution is stirred at ambient temperatures for 3 to 4 hours. The product is filtered, washed with n-butanol, dried without heat in vacuo to yield 13.0 g. 3,3'-(p-hydroxyphenylimino)bispropionamide, tan powder, melting at 153°–155°C.

EXAMPLE 11

3-(4-Nitro-o-toluidino)propionamide

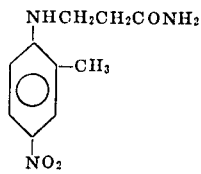

To 40 ml. dimethylformamide is added in portions, 7.6 g. (0.05 mole) 2-methyl-4-nitroaniline, 3.6 g. (0.05 mole) acrylamide and 200 mg. potassium-t-butoxide. After addition is complete the solution is stirred at reflux for 6 hours. It is poured with stirring into 1500 ml. water. The precipitate is collected by filtration, washed with 500 ml. water and dried in a steam oven to yield 3.9 g. of crude product. Separation of 3-(4-nitro-o-toluidino)propionamide from starting material and by-products is effected by column chromatography. The chromatography system used is as follows: 100 g. silica gel packed in benzene. Eluted with 1:1 ethyl acetate-benzene, benzene, 1:10 chloroform-benzene, 1:1 chloroform-benzene, chloroform, 1:1 ethyl acetate-chloroform, ethanol. From the column 0.49 g. of 3-(4-nitro-o-toluidino)propionamide is obtained, as a yellow powder, melting at 165.5°–167.0°C.

EXAMPLE 12

3-(4-Nitro-o-anisidino)propionamide

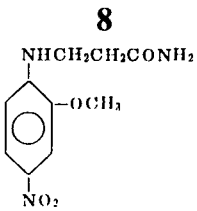

A mixture of 33.6 g. (0.2 mole) 4-nitro-o-anisidine, 100 ml. glacial acetic acid, 15.6 g. (0.22 mole) acrylamide, 0.5 g. cupric acetate and 0.1 g. hydroquinone, is heated at reflux for 6 hours, cooled to room temperature overnight and filtered. The solids are recrystallized from acetone-benzene mixtures to yield 41 g. 3-(4-nitro-o-anisidino)propionamide as a yellow crystalline solid, melting at 157°–157.5°C.

EXAMPLE 13

3-(2-Chloro-4-nitroanilino)propionamide

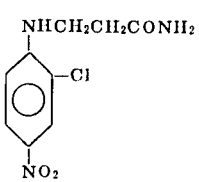

To 40 ml. dimethylformamide is added in portions, 8.6 g. (0.05 mole) 2-chloro-4-nitroaniline, 7.1 g. (0.05 mole) acrylamide and 200 mg. potassium-t-butoxide. After heating at the reflux for 4 hours, the cooled solution is poured into 1500 ml. water. The precipitate is collected by filtration, washed with 500 ml. water and dried in a steam oven to yield 10.2 g. crude product. A 2.0 g. sample is recrystallized from water, then ethanol, to yield 1.4 g. of 3-(2-chloro-4-nitroanilino)propionamide, as a yellow powder, melting at 147.5°–148.5°C.

EXAMPLE 14

3-(2,4-Dinitroanilino)propionamide

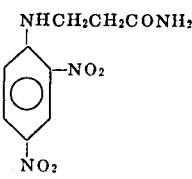

To 125 ml. dimethylformamide is added 45.5 g. (0.25 mole) 2,4-dinitroaniline, 18.0 g. (0.25 mole) acrylamide and 500 mg. potassium-t-butoxide. After heating at the reflux for 8 hours, the cooled solution is poured into 2000 ml. benzene, stirred for 1 hour, filtered, washed with 500 ml. benzene and dried in a steam oven to yield 34.0 g. crude product. A 2.0 g. sample after recrystallization from ethanol-ethyl acetate, yields 1.5 g. 3-(2,4-dinitroanilino)propionamide, a yellow powder, melting at 123°–124.5°C.

EXAMPLE 15

3-(4-Nitro-1-naphthylamino)propionamide

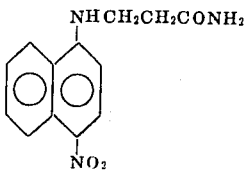

To 50 ml. dimethylformamide is added 18.8 g. (0.1 mole) 1-amino-4-nitro naphthalene, 7.1 (0.1 mole) acrylamide and 200 mg. potassium-t-butoxide. After heating at reflux for 8 hours and cooled, the solution is drowned in 1500 ml. water, filtered, washed with 500 ml. water and dried in a steam oven to yield 7.1 g. crude product. A 2.0 g. sample after recrystallization from methanol, ethanol and acetonitrile, yields 0.42 g. 3-(4-nitro-b1-naphthylamino)propionamide, orange crystals, melting at 205°–206.5°C.

When the product is reduced using the procedure of Example 2, the nitro group of the above product is reduced to an amino group and the product obtained is 3-(4-amino-1-naphthylamino)propionamide.

EXAMPLE 16

3-(4'-Nitro-4-biphenylylamino)propionamide

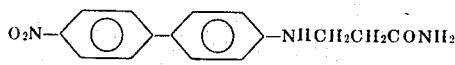

If in Example 15, 0.1 mole of 1-amino-4-nitronaphthalene is replaced with 21.4 g. (0.1 mole) 4-amino-4'-nitrobiphenyl and the rest of the procedure of Example 15 followed, the product obtained is 3-(4'-nitro-4-biphenylylamino)propionamide. Doubling the proportion of acrylamide provides the 3,3'-[(4'-nitro-4-phenylyl)imino]bispropionamide. Using the procedure of Example 2, the nitro group in either compound is reduced to an amino group to provide 3-(4-aminobiphenylylamino)propionamide and 3,3'-[(4'-amino-4-biphenylyl)imino]bispropionamide, respectively.

EXAMPLE 17

3-(3-Nitro-p-toluidino)propionamide

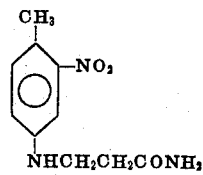

To a mixture of 80 ml. toluene and 20 ml. glacial acetic acid is added 30.4 g. (0.2 mole) 3-nitro-p-toluidine. The mixture is taken to reflux with stirring and a solution of 15.64 g. (0.22 mole) acrylamide in acetone is added over 1.5 hours. The acetone is allowed to distill as it is being added. An additional 100 ml. toluene is then added and the reaction is stirred at reflux for 2 hours, cooled to room temperature and chromatographed on a short alumina column. The first fraction is discarded and the second fraction on evaporation results in 7.0 g. of 3-(3-nitro-p-toluidino)propionamide, a yellow powder, melting at 118.5°C.

EXAMPLE 18

3-(3-Amino-p-toluidino)propionamide dihydrochloride

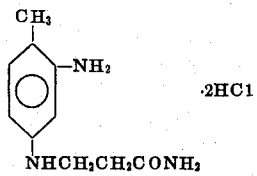

To 200 ml. ethyl alcohol is added 10 g. 3-(4-methyl-3-nitrophenyl)propionamide and a catalytic amount (0.05 g.) of 10 percent palladium on carbon. The mixture is shaken in a Parr apparatus for 2 days under 40 psi of hydrogen. The reaction is filtered and the filtrate is saturated with hydrogen chloride. The solids are filtered resulting in 12 g. 3-(3-amino-p-toluidino)propionamide dihydrochloride, a white powder, melting at 222°C. (dec.).

EXAMPLE 19

3-(5-Nitro-o-toluidino)propionamide

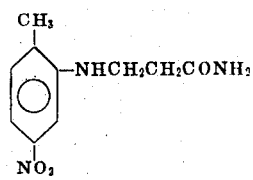

The above compound is prepared substantially as described in Example 17 except that 5-nitro-o-toluidine is substituted for the 3-nitro-p-toluidine. The compound melts at 168°–169.5°C.

EXAMPLE 20

3-(5-Amino-o-toluidino)propionamide dihydrochloride

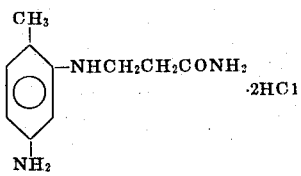

If, in Example 18, one substitutes an equal quantity of 3-(5-nitro-o-toluidino)propionamide for 3-(4-methyl-3nitrophenyl)propionamide, there is obtained 5.26 g. of 3-(5-amino-o-toluidino)propionamide dihydrochloride as a white powder, melting at 207.5°–208.5°C.

EXAMPLE 21

3-(5-Nitro-o-anisidino)propionamide

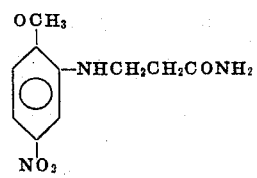

To a refluxing mixture of 33.6 g. (0.2 mole) 2-amino-4-nitro anisole and 100 ml. glacial acetic acid, is added 15.6 g. (0.22 mole) acrylamide in portions over 15 minutes. After heating at the reflux for an additional hour, the reaction mixture is treated with activated carbon, filtered, and evaporated under vacuum to the point of crystallization. The product is recrystallized from acetone to yield 6.9 g. 3-(5-nitro-o-anisidino)propionamide, a yellow crystalline solid, melting at 159°–160°C.

EXAMPLE 22

3-(5-Amino-o-anisidino)propionamide dihydrochloride

If, in Example 18, one substitutes 29 g. of 3-(5-nitro-o-anisidino)propionamide for 3-(4-methyl-3-nitrophenyl)-propionamide, there is obtained 14.68 g. 3-(5-amino-o-anisidino)-propionamide dihydrochloride as a white powder, melting at 199°–200°C. (dec.).

EXAMPLE 23

3-(2-Amino-4-nitroanilino)propionamide

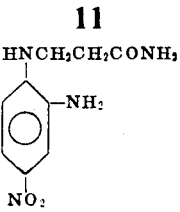

To a refluxing mixture of 38.1 g. (0.15 mole) 3-(2,4-dinitroanilino)propionamide and 500 ml. methyl alcohol, is added over 30 minutes, a solution of 60 g. (0.25 mole) sodium sulfide monohydrate, 19.5 g. (0.23 mole) sodium bicarbonate and 150 ml. water. After heating at reflux for an additional 2 hours, the reaction mixture is cooled to room temperature, stripped to dryness under vacuum and recrystallized from methyl alcohol to yield 26.2 g. 3-(2-amino-4-nitroanilino)propionamide, a dark reddish-brown crystalline solid, melting at 204°–205°C.

EXAMPLE 24

3-(4-Amino-o-toluidino)propionamide dihydrochloride

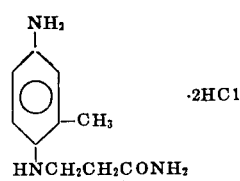

If in Example 18 one substitutes an equal quantity of 3-(4-nitro-o-toluidino)propionamide for 3-(4-methyl-3-nitrophenyl)propionamide, then there is obtained 8.7 g. of 3-(4-amino-o-toluidino)propionamide dihydrochloride as a white powder, melting at 206°C. (dec.).

EXAMPLE 25

3-[(4-Amino-1-naphthyl)amino]propionamide dihydrochloride

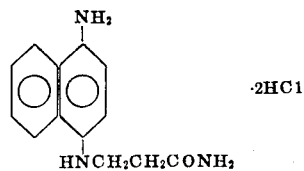

If in Example 18, one substitutes 2.2 g. 3-(4-nitro-1-naphthylamino)propionamide for 3-(4-methyl-3-nitrophenyl)-propionamide, there is obtained 2 g. 3-[(4-amino-1-naphthyl)-amino]propionamide dihydrochloride, as a white powder, melting at 290°C. (dec.).

EXAMPLE 26

3,3'-(3-Nitro-p-tolylimino)bispropionamide

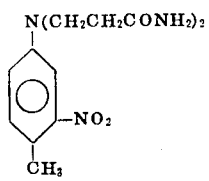

To a refluxing mixture of 7.1 g. (0.047 mole) 3-nitro-p-toluidine and 25 ml. acetic acid is added 3.91 g. (0.055 mole) acrylamide in portions over 1.5 hours. After heating at reflux for an additional 30 minutes, the reaction mixture is poured over ice, neutralized with 200 ml. 5N caustic and extracted with 1 liter of chloroform. The aqueous layer is filtered and the solids recrystallized from acetone to yield 0.050 g. 3,3'-(3-nitro-p-tolylimino)bispropionamide as a pale yellow solid, melting at 197°–198°C.

EXAMPLE 27

3,3'-(2-Methoxy-5-nitrophenylimino)bispropionamide

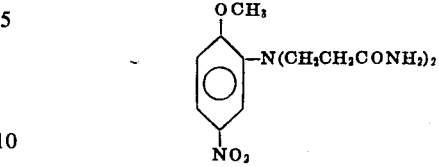

A mixture of 33.6 g. (0.2 mole) 5-nitro-o-anisidine, 150 ml. benzene, 10 ml. acetic acid, 15.6 g. (0.22 mole) acrylamide and 2 drops of concentrated sulfuric acid are stirred at ambient temperature, then taken to reflux for 30 minutes. After cooling to 50°C. the solids are filtered, washed with benzene and recrystallized from acetone to yield 3.95 g. 3,3'-(2-methoxy-5-nitrophenylimino)bispropionamide, a yellow crystalline solid, melting at 132°–133°C.

EXAMPLE 28

3-(2-Hydroxy-4-nitroanilino)propionamide

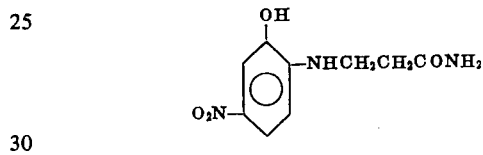

A mixture of 30.8 g. (0.2 mole) 2-amino-5-nitrophenol, 200 ml. toluene, 15.6 g. (0.22 mole) acrylamide, 20 mg. hydroquinone and 5 drops of concentrated sulfuric acid is heated at reflux for 45 minutes. The solids are filtered hot, washed with benzene and dried under vacuum to yield 46.5 g. 3-(2-hydroxy-4-nitroanilino)propionamide, a yellow solid, melting at 208.5°–209°C.

EXAMPLE 29

3-(4-Amino-2-hydroxyanilino)propionamide dihydrochloride

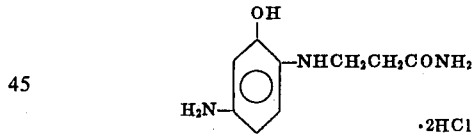

If, in Example 18, one substitutes an equal quantity of 3-(2-hydroxy-4-nitroanilino)propionamide for 3-(4-methyl-3-nitro phenyl)propionamide, there is obtained 11.71 g. of 3-(4-amino-2-hydroxyanilino)propionamide dihydrochloride, as a white solid, melting at 222°C. (dec.).

EXAMPLE 30

3-(4-Hydroxy-3-nitroanilino)propionamide

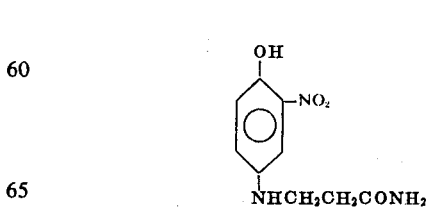

If, in Example 28, one substitutes an equal quantity of 4-amino-2-nitrophenol in place of 2-amino-5-nitro phenol, then there is obtained 10 g. 3-(4-hydroxy-3-nitroanilino)propionamide as a yellow solid, melting at 168°–169°C.

EXAMPLE 31

3-(3-Amino-4-hydroxyanilino)propionamide dihydrochloride

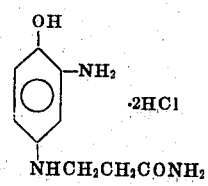

If in Example 18, one substitutes 5 g. 3-(4-hydroxy-3-nitro anilino)propionamide for 3-(4-methyl-3-nitro phenyl)propionamide, there is obtained 5.88 g. 3-(3-amino-4-hydroxy anilino)propionamide dihydrochloride, a white powder, melting at 231°C. (dec.).

EXAMPLE 32

3-(o-Hydroxyanilino)propionamide

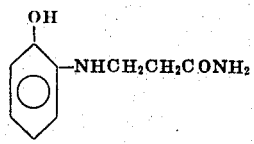

If in Example 28, one substitutes 32.7 g. o-amino phenol for 2-amino-5-nitro phenol and uses 23.5 g. acrylamide and 150 ml. toluene, there is obtained 3 g. 3-(o-hydroxyanilino)-propionamide as an off white solid, melting at 93.5°–94°C.

EXAMPLE 33

3-(2,4-Diaminoanilino)propionamide

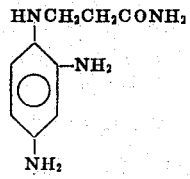

If in Example 2, one substitutes 10 g. 3-(2,4-dinitroanilino)propionamide for 3-(p-nitroanilino)propionamide, there is obtained 5.5 g. 3-(2,4-diaminoanilino)propionamide, as an off-white solid, melting at 127.5°–129°C.

EXAMPLE 34

3-(3,4-Diaminoanilino)propionamide dihydrochloride

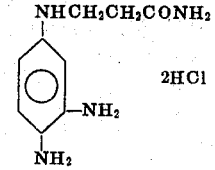

If in Example 18, one substitutes an equal quantity of 3-(4-amino-3-nitroanilino)propionamide for 3-(4-methyl-3-nitrophenyl)propionamide, there is obtained 11.6 g. of 3-(3,4-diaminoanilino)propionamide dihydrochloride, a white solid.

EXAMPLE 35

3-(4-Amino-o-anisidino)propionamide dihydrochloride

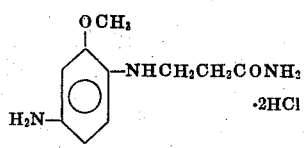

If in Example 18, one substitutes 5.15 g. 3-(4-nitro-o-anisidino)propionamide for 3-(4-methyl-3-nitrophenyl)propionamide, there is obtained 5.75 g. 3-(4-amino-o-anisidino)propionamide dihydrochloride, a white solid, melting at 184°C. (dec.).

EXAMPLE 36

3-(4-Amino-2-nitroanilino)propionamide

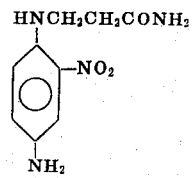

A mixture of 1 g. 5 percent platinum on carbon, 10 ml. concentrated hydrochloric acid, 200 cc. alcohol and 12.7 g. (0.05 mole) 3-(2,4-dinitro anilino)propionamide is shaken in a Parr Apparatus for 3 hours; the solids are filtered and washed with isopropanol and acetone. The solids are dissolved in 250 ml. water, basified with concentrated ammonium hydroxide, filtered, dried and recrystallized from acetone to yield 5.03 g. 3-(4-amino-2-nitroanilino)propionamide as a reddish brown crystalline solid, melting at 205°–206°C.

EXAMPLE 37

3-(4'-Amino biphenylylamino)propionamide

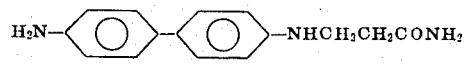

If in Example 2, one substitutes 5 g. 3-(4'-nitro-4-biphenylamino)propionamide for 3-(p-nitroanilino)propionamide, there is obtained 2.54 g. of 3-(4'-amino biphenylylamino)propionamide as an off-white solid, melting at 176.5°–177°C.

EXAMPLE 38

Utility as Oxidation Dye

A. A dye composition is prepared as follows:
To 54.9 parts water is added 10 parts of the non-ionic dispersing agent isooctylphenyl(polyethoxy)ethanol, 0.1 part sodium sulfite and 4 parts lauric acid diethanolamide. The whole is heated with stirring to 70°C. during which 6 parts 3-(p-amino-anilino)propionamide (Example 2) is added. When solution of the dye is complete, the whole is cooled to 35°C. with stirring. To the solution of the dye is added 10 parts isopropanol, 10 parts oleic acid and 5 parts 28 percent ammonium hydroxide solution.

B. One part dye composition of "A" above is mixed with an equal part of 6 percent hydrogen peroxide solution.

C. Yellowish grey hair is contacted with the mixture of the composition of "B" without delay at ambient temperature for 20 to 30 minutes. The hair is then thoroughly rinsed, washed with a dilute shampoo and dried. The result is a deep brown-black uniform color of good fastness to light.

When the above procedure is applied to other compounds of the foregoing examples, the following results are obtained:

| Compound of Example | Color of Dyed Hair |
|---|---|
| 4 | grey |
| 5 | yellow |
| 9 | light brown |
| 2+20(or 22) | blue |
| 2+29 | brown |
| 2+31(or 32) | brown |
| 33 | green |
| 34 | green |

EXAMPLE 39

Utility as Direct Dye

A dye composition is prepared by adding 0.5 part 3-(4-amino-3-nitroanilino)propionamide (Example 7) to a solution prepared by mixing 3 parts benzyl alcohol, 5 parts polyethoxylated oleylammonium chloride, 0.5 part ammonium phosphate, water to make 100 parts and heating to 70°C. The whole is cooled to ambient temperature.

Virgin albino hair is immersed in this composition for 10 to 15 minutes. The hair is rinsed with water, washed with a dilute shampoo and dried. The hair is dyed a reddish-blue shade.

When this procedure is used for the following nitro compounds of this invention, the result on albino hair is as follows:

| Compound of Example | Color of Dyed Hair |
|---|---|
| 1 | bright yellow |
| 3 | yellow |
| 7 | bluish red |
| 8 | bluish red |
| 11 to 15 | yellow |
| 28 | yellow |
| 30 | orange |
| 36 | red |

EXAMPLE 40

| | |
|---|---|
| Compound of Example 2 | 6.0 |
| Sodium sulfite | 0.1 |
| Isopropyl alcohol | 10.0 |
| Oleic acid | 10.0 |
| Alkyl phenol/ethylene oxide condensate | 10.0 |
| Lauric acid diethanolamide | 4.0 |
| Ammonia (28%) | 5.0 |
| Water | qs to 100.0 |

When an equal part of 6 percent $H_2O_2$ is admixed with the above composition and the resulting solution is applied to yellow grey hair over 20–30 minutes, the hair is uniformly dyed a deep brown black.

EXAMPLE 41

| | |
|---|---|
| Compound of Example 2 | 4.0 |
| Compound of Example 6 | 0.2 |
| Compound of Example 7 | 0.15 |
| Sodium sulfite | 0.1 |
| Oleic acid | 10.0 |
| Alkyl phenol ethylene oxide | 10.0 |
| Lauric acid diethanolamide | 4.0 |
| Ammonia (28%) | 5.0 |
| Water | qs to 100.0 |

When admixed with $H_2O_2$ and applied to yellow grey hair as in Example 42, this composition uniformly dyes the hair a dark brown.

EXAMPLE 42

| | |
|---|---|
| Compound of Example 3 | 4.0 |
| Sodium sulfite | 0.1 |
| Isopropyl alcohol | 10.0 |
| Oleic acid | 10.0 |
| Alkyl phenol ethylene oxide | 10.0 |
| Lauric acid diethanolamide | 4.0 |
| Ammonia (28%) | 5.0 |
| Water | qs to 100.0 |

When admixed with $H_2O_2$ and applied to yellow grey hair as in Example 40, this composition uniformly dyes the hair a dark bluish grey.

EXAMPLE 43

| | |
|---|---|
| Compound of Example 2 | 5.0 |
| 2,4-Dinitro phenol | 0.4 |
| p-Hydroxy anisole | 1.0 |
| Sodium sulfite | 0.1 |
| Isopropyl alcohol | 10.0 |
| Oleic acid | 10.0 |
| Alkyl phenol ethylene oxide | 10.0 |
| Lauric acid diethanolamide | 4.0 |
| Ammonia (28%) | 5.0 |
| Water | qs to 100.0 |

When admixed with $H_2O_2$ and applied to albino hair over 15–20 minutes as in Example 40, this composition uniformly dyes the hair a dark drab brown.

EXAMPLE 44

| | |
|---|---|
| Compound of Example 2 | 6.0 |
| o-Amino phenol | 0.4 |
| Pyrocatechol | 1.3 |
| Phloroglucinol | 0.5 |
| Meta diamino anisol sulfate | 0.1 |
| Sodium sulfite | 0.5 |
| Alkyl phenol ethylene oxide | 17.0 |
| Isopropyl alcohol | 18.0 |
| Oleic acid | 18.0 |
| Oleyl alcohol | 17.0 |
| Ammonia (28%) | 5.0 |
| Water | qs to 100.0 |

When admixed with $H_2O_2$ and applied to albino hair as in Example 43, this composition uniformly dyes the hair black.

EXAMPLE 45

| | |
|---|---|
| Compound of Example 2 | 0.65 |
| o-Nitro p-phenylene diamine | 0.008 |
| Phloroglucinol | 0.16 |
| p-Amino phenol | 0.15 |
| Resorcinol | 0.14 |
| Sodium sulfite | 0.1 |
| Alkyl phenol ethylene oxide | 17.0 |
| Isopropyl alcohol | 18.0 |
| Oleic acid | 8.0 |
| Oleyl alcohol | 17.0 |
| Ammonium hydroxide | 5.0 |
| Water | qs to 100.0 |

When admixed with $H_2O_2$ and applied to albino hair as in Example 43, this composition uniformly dyes the hair blonde.

EXAMPLE 46

3,3'-(p-aminophenylimino)bispropionamide hydrochloride

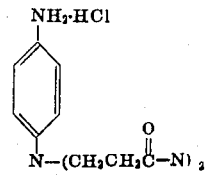

A well-stirred mixture of 400 ml. of water, 27.9 g. (0.5 m.) of iron powder and 3 ml. of glacial acetic acid is warmed to 70°C. and there is then added in portions 50.2 g. (0.18 m.) of the 3,3'-(p-nitrophenylimino)bispropionamide of Example 3. During addition, the temperature rises and is approximately 90°C. at the finish. The mixture is stirred at 90°–95°C. for one-half hour after the addition is completed, cooled to 75°C. and sufficient sodium carbonate added to remove all dissolved iron salts. There is then added activated charcoal and the mixture is filtered hot through a diatomaceous earth filter. The filtrate is made just acid to Congo Red indicator paper with concentrated hydrochloric acid and cooled to 0°C. The resulting precipitate is collected by filtration and dried in vacuo at 40°C. to yield 36.1 g. (70.3 percent of theory) of 3,3'-(p-aminophenylimino)bispropionamide hydrochloride, pink-tinged crystals, m. 203°–204°C. This compound when applied in a suitable vehicle to hair, as described in Examples 40 and 43, imparts desirable shades thereto.

I claim:

1. A method for dyeing keratinaceous materials which comprises contacting said material with a compound of the formula $$\left[ Ar \begin{array}{c} R^1 \\ R^2 \\ R^3 \end{array} \right]$$

or acid addition salts thereof where:

Ar is a radical of the benzene, biphenyl or naphthalene series;

$R^1$ is 2-carbamoylethylamino or bis(2-carbamoylethyl)-amino;

$R^2$ is amino, nitro, hydroxy or $R^1$; and $R^3$ is hydrogen, chloro, methyl, methoxy, [halo, lower alkoxy] amino, nitro or $R^1$.

2. The method of claim 1 wherein said compound is 3,3'-(p-phenylenediimino)bispropionamide.

3. The method of claim 1 wherein said compound is 3-(p-aminoanilino)propionamide.

4. The method of claim 1 wherein said compound is 3-(4-amino-3-nitroanilino)propionamide.

5. The method of claim 1 wherein said compound is 3-(5-amino-o-anisidino)propionamide dihydrochloride.

6. The method of claim 1 wherein said compound is 3-(5-amino-o-toluidino)propionamide dihydrochloride.

7. The method of claim 1 wherein said compound is 3-(2,4-dinitroanilino)propionamide.

* * * * *

UNITED STATES PATENT OFFICE
CERTIFICATE OF CORRECTION

Patent No. 3,658,454      Dated  April 25, 1972

Inventor(s) ALBERT PETER PAUL

It is certified that error appears in the above-identified patent and that said Letters Patent are hereby corrected as shown below:

Column 2, line 45 insert -- tetramino-biphenyl -- after the numbers "3,3',4,4'".

Signed and sealed this 24th day of October 1972.

(SEAL)
Attest:

EDWARD M. FLETCHER, JR.
Attesting Officer

ROBERT GOTTSCHALK
Commissioner of Patents